United States Patent
Pottlapelli et al.

(10) Patent No.: US 9,117,189 B2
(45) Date of Patent: Aug. 25, 2015

(54) SYSTEM AND METHOD FOR OBJECT LOCK MANAGEMENT USING CACHED LOCK OBJECTS

(71) Applicant: Oracle International Corporation, Redwood Shores, CA (US)

(72) Inventors: Murali Pottlapelli, Chino, CA (US); Yogesh Kumar, Sunnyvale, CA (US); Vikas Anand, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 98 days.

(21) Appl. No.: 13/974,319

(22) Filed: Aug. 23, 2013

(65) Prior Publication Data

US 2015/0058071 A1 Feb. 26, 2015

(51) Int. Cl.
*G06F 9/44* (2006.01)
*G06F 15/173* (2006.01)
*G06Q 10/06* (2012.01)
*G06F 17/30* (2006.01)
*G06F 11/34* (2006.01)

(52) U.S. Cl.
CPC ...... *G06Q 10/06316* (2013.01); *G06F 11/3466* (2013.01); *G06F 17/30171* (2013.01); *G06F 17/30902* (2013.01); *H05K 999/00* (2013.01); *G06F 2201/865* (2013.01); *G06F 2201/885* (2013.01)

(58) Field of Classification Search
CPC ............. G06F 8/30; G06F 8/31; G06F 8/315; G06F 8/34; G06F 8/35; G06F 8/24; G06F 11/3466; G06F 2201/865; G06F 2201/885; G06F 17/30902; Y10S 707/99938
See application file for complete search history.

(56) References Cited

U.S. PATENT DOCUMENTS

| | | | |
|---|---|---|---|
| 6,438,594 B1 * | 8/2002 | Bowman-Amuah | 709/225 |
| 7,020,684 B2 * | 3/2006 | White et al. | 709/223 |
| 7,617,479 B2 * | 11/2009 | Hambrick et al. | 717/127 |
| 7,669,186 B2 * | 2/2010 | Nolan et al. | 717/127 |

(Continued)

OTHER PUBLICATIONS

Meng Fanbo et al., A Business Process Management System based on workflow Technologies, IEEE, 2010, retrieved online on May 13, 2015, pp. 168-172. Retrieved from the Internet <URL: http://ieeexplore.ieee.org/stamp/stamp.jsp?tp=&arnumber=5693706>.*

(Continued)

*Primary Examiner* — Thuy Dao
*Assistant Examiner* — Hanh T Bui
(74) *Attorney, Agent, or Firm* — Tucker Ellis LLP

(57) ABSTRACT

A system and method for enhancing performance of a business process execution engine, utilizing a database, a cache, and a lock management system operating in cache. The lock management system, upon receiving a request for a stored business process instance, determines by accessing the cache whether stored business process instance is locked and if the lock is expired. The stored business process object is served to the business process execution engine if it is not locked or the lock is expired. The lock functionality is implemented by writing, rewriting, and/or erasing a companion lock object stored in the cache such that no database access is required to determine whether a stored business process instance is locked.

14 Claims, 5 Drawing Sheets

(56) References Cited

U.S. PATENT DOCUMENTS

| | | | |
|---|---|---|---|
| 2001/0018689 A1* | 8/2001 | Spence et al. | 707/103 R |
| 2004/0249940 A1* | 12/2004 | Sohn et al. | 709/225 |
| 2013/0212588 A1* | 8/2013 | Barabas et al. | 718/102 |
| 2013/0246622 A1* | 9/2013 | Iliev et al. | 709/225 |
| 2014/0101202 A1* | 4/2014 | Iliev et al. | 707/781 |

OTHER PUBLICATIONS

Haris Volos et al., Mnemosyne: Lightweight Persistent Memory, ACM, 2011, retrieved online on May 13, 2015, pp. 91-103. Retrieved from the Internet: <URL: http://delivery.acm.org/10.1145/1960000/1950379/p91-volos.pdf?>.*

* cited by examiner

Figure 4C
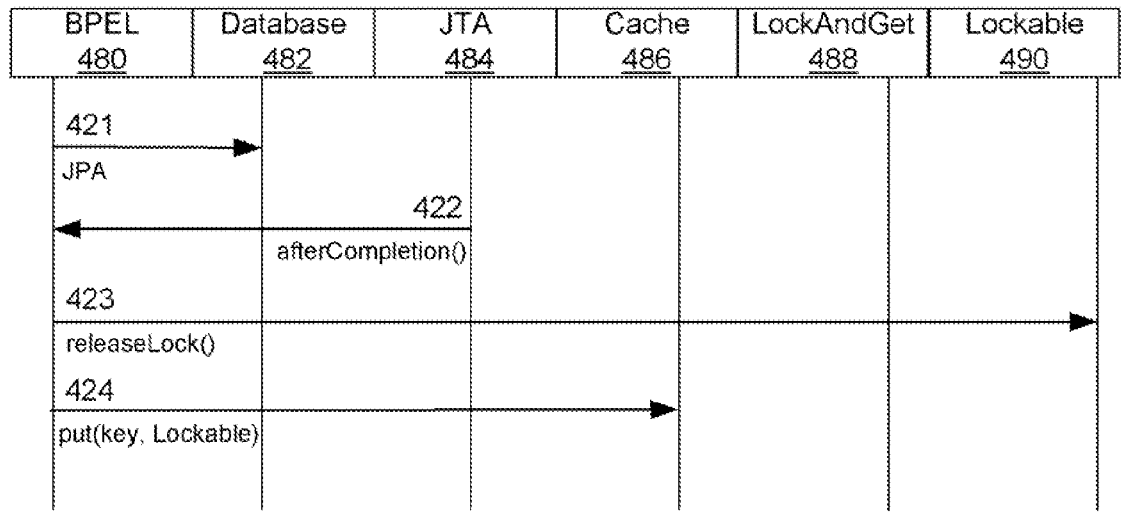
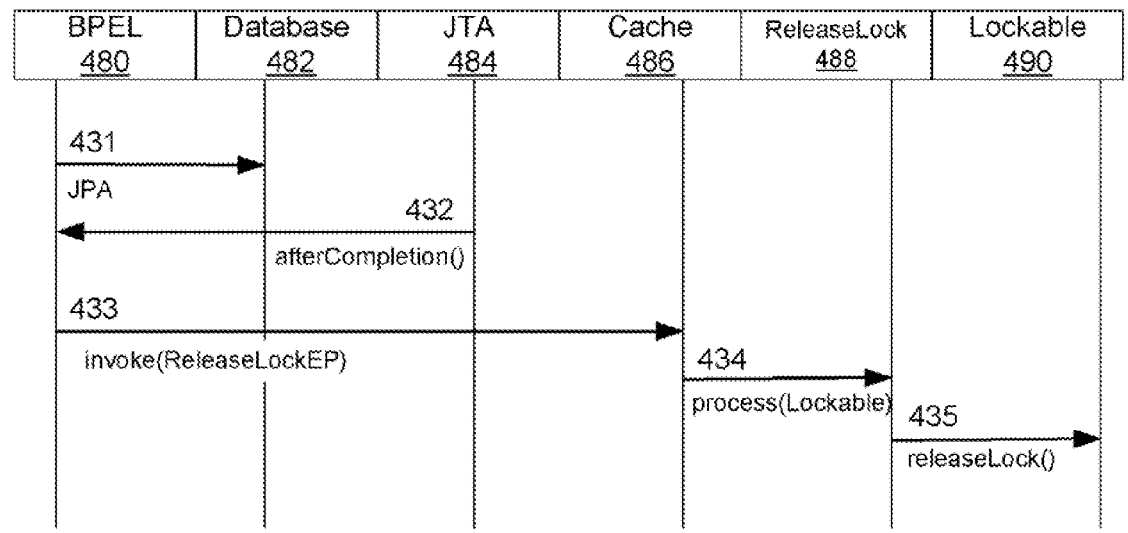
Figure 4D

SYSTEM AND METHOD FOR OBJECT LOCK MANAGEMENT USING CACHED LOCK OBJECTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to business process management systems and in particular to systems and methods for object lock management in a business process execution environment.

BACKGROUND

Within large business enterprises, management of business processes is becoming a more significant issue as companies vie to improve efficiency, reduce costs, increase profits and gain more flexible and dynamic infrastructures. Business processes are a part of the day-to-day operations and services of any corporation. For example, a business process may include applying for a home loan (e.g. loan origination process), starting a mobile phone service (account initiation process), hiring a new employee (employee on-boarding process), building a new jet engine (parts and assembly process), as well as countless other processes performed by enterprises and organizations in order to accomplish specific goals.

Processes can range from very simple to highly complex and sophisticated, involving numerous decisions, tasks and activities. In this context, a business process can be thought of as a series of steps (tasks) that are executed in a particular order or path in order to achieve an objective in an organization. A business process can be visualized as a flowchart of a sequence of activities. Business processes often change over time and are useful for analyzing and optimizing the business model of a particular organization.

Business Process Execution Language (BPEL) is a text-based (XML) executable language for representing business processes. It is particularly useful to define business processes that use Web Services to interact with other entities. BPEL can be used as a standard executable orchestration language to specify interactions with Web Services. BPEL processes are represented in extensible markup language (XML) and these processes orchestrate synchronous and asynchronous services into end-to-end flows.

Business Process Execution Language (BPEL) may be used for defining how business processes interact with web services. In some instances, when a BPEL process is being executed, interaction with an external web service is necessary. Waiting for a response from the external web service or some other entity may take a significant amount of time, such as several minutes, hours, or days. When a response is required, rather than maintaining the BPEL process as active, it may be more efficient to temporarily suspend processing of the BPEL process to free memory and/or processing resources.

To suspend the BPEL process instance, dehydration may be performed. Dehydration involves data related to the BPEL process instance being stored in a data storage structure, such as a database residing on a hard drive, until processing is to resume. Such dehydration may involve all values of variables of the BPEL process being stored and an indication of where in the BPEL code the BPEL process was suspended. This data may be stored in the dehydration store. Once a response is received from the external web service, the BPEL process instance may be "rehydrated," such that the values of variables are reloaded from the data storage structure, and the BPEL process can continue being processed.

However, where multiple process instances are interested in the same data, it is important to ensure that the multiple process instances do not modify the same data object at the same time. Accordingly it is desirable to provide systems and methods which prevent conflicting access to data objects upon rehydration of a BPEL process instance. It would further be desirable that the systems and methods have low overhead with respect to memory, processing, and latency.

SUMMARY

Embodiments of the present invention provide a lock management system and method which prevents conflicting access to data objects upon rehydration of a BPEL process instance.

Embodiments of the present invention provide a lock management system which prevents conflicting access to data objects upon rehydration of a BPEL process instance while having low memory, processing, and latency overhead.

Embodiments of the present invention provide a lock management system which prevents conflicting access to data objects upon rehydration of a BPEL process instance from a cache. Advantageously, lock objects are provided in the cache itself such that access to an underlying database is not necessary to retrieve the lock object.

In a particular embodiment, the present invention provides a system and method for enhancing performance of a business process execution engine, utilizing a database, a cache, and a lock management system operating in cache. The lock management system, upon receiving a request for a stored business process instance, determines by accessing the cache whether stored business process instance is locked and if the lock is expired. The stored business process object is served to the business process execution engine if it is not locked or the lock is expired. The lock functionality is implemented by writing, rewriting, and/or erasing a companion lock object stored in the cache such that no database access is required to determine whether a stored business process instance is locked.

Other objects and advantages of the present invention will become apparent to those skilled in the art from the following detailed description of the various embodiments, when read in light of the accompanying drawings.

BRIEF DESCRIPTION OF THE DRAWINGS

FIGS. 4A-4D show sequence diagrams for a system incorporating lock management functionality according to an embodiment of the present invention.

DETAILED DESCRIPTION

Figure 1:
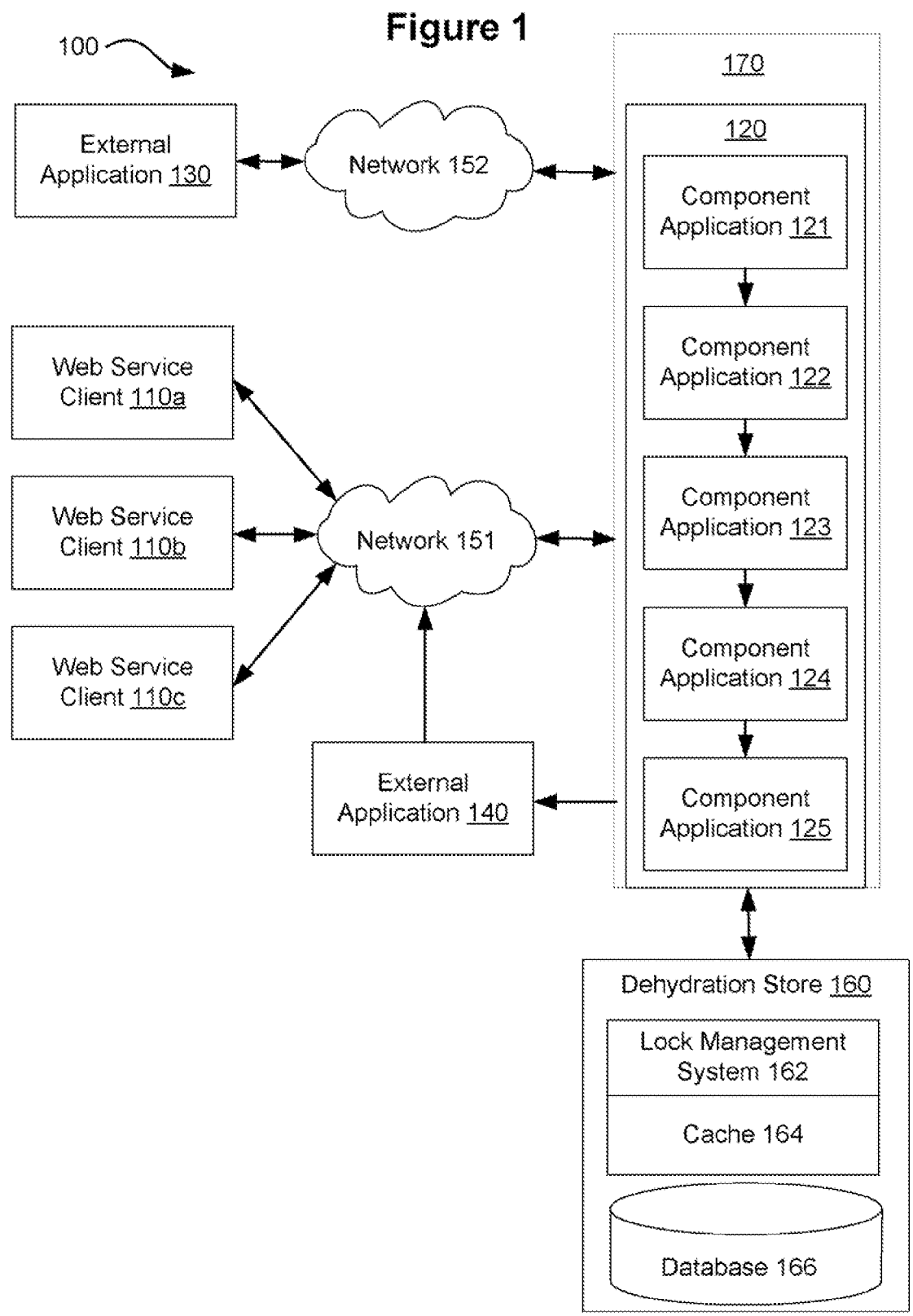
FIG. 1 illustrates an embodiment of a system that includes a BPEL composite application and a dehydration store incorporating an object lock management system according to an embodiment of the present invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the Figures and detailed description; therefore, reference numerals used in a Figure may or may not be referenced in the detailed description specific to such figure if the element is described elsewhere. The first digit in a three digit reference numeral indicates the series of Figures in which the element first appears.

Although the Figures depict components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Embodiments of the present invention provide a lock management system which prevents conflicting access to data objects upon rehydration of a BPEL process instance while having low memory, processing, and latency overhead. In particular embodiments of the present invention provide a lock management system which prevents conflicting access to data objects upon rehydration of a BPEL process instance from a cache. Advantageously, lock objects are provided in the cache itself such that access to an underlying database is not necessary to retrieve the lock object.

FIG. 1 illustrates an embodiment of a system 100 that includes a BPEL composite application 120 that has been compiled into JAVA code and is executed as a BPEL runtime process of BPEL Engine 170. System 100 includes: web service clients 110a, 110b, 110c, BPEL composite application 120, external applications 130 and 140, and network 151. System 100 also includes a dehydration store 160 comprising a cache 164 in addition to a database 166. Cache 164 is a side non-transactional cache. In an embodiment Cache 164 is implemented using ORACLE Coherence, an in-memory data grid solution that enables organizations to predictably scale mission-critical applications by providing fast access to frequently used data.

Web service clients 110 may be entities (e.g., remote computer systems) that request a web service from BPEL composite application 120. Web service clients 110 may be operated by users. Web service clients 110 may communicate with BPEL composite application 120 via network 151. While system 100 is illustrated as having three web service clients (110a, 110b, and 110c), more or fewer web service clients may be present. For example, BPEL composite application 120 may be executed for one web service client, or tens, hundreds, or thousands of web service clients. Network 151 may represent one or more public and/or private networks. Network 151 may represent the Internet. As such, network 151 may allow web service clients 110a, 110b, and 110c to communicate with BPEL composite application 120. In some embodiments, one or more of web service clients 110a, 110b, and 110c may communicate with BPEL composite application 120 without using network 151.

BPEL composite application 120 may represent a process-oriented composite application created using BPEL. Instances of BPEL composite application 120 may be executed as one or more runtime processes (not illustrated). For example, each web service client of web service clients 110a, 110b, and 110c may interact with a process being executed that is based on BPEL composite application 120. As such, different processes may represent different instantiations of BPEL composite application 120. In some embodiments, BPEL may be used as part of an ORACLE Service Oriented Architecture (SOA) for designing, deploying, and managing composite applications. Processes based on BPEL composite application 120 may be executed by one or more computer systems. In an embodiment of the invention, the computer systems are connected to a dehydration store 160 incorporating object lock management systems and methods as described herein.

As shown in FIG. 1, a process-oriented composite application may include various component applications (in system 100, component applications 121, 122, 123, 124, and 125 are present) to provide an output or result to some external application or to a web service client. Each component application may perform one or more particular functions, with the output of one component application serving as an input to one or more other component applications that are linked. Such an arrangement may allow for a designer to program in a declarative nature, that is, allowing the designer to specify what outputs the composite application should accomplish, but not how it should accomplish generating those outputs on the code level. For example, for a designer to create a BPEL composite application, the designer may use a graphical user interface to interconnect a series of component applications in a desired order. The resulting composite application may then use this combination and order of component applications to provide an output.

A process-oriented composite application may process threads for many different web service clients simultaneously or near-simultaneously (this may also be referred to as multiple processes of the process-oriented composite application being executed simultaneously or near-simultaneously). As such, BPEL composite application 120 may have multiple associated BPEL processes (also referred to as BPEL runtime processes) being executed at the same time. For example, component application 122 may be being executed as part of a first BPEL process in relation to web service client 110a, while component application 124 is being executed as part of a second BPEL process in relation to web service client 110b. Further, a single component application may be executed on behalf of multiple web service clients. For example, component application 123 may be executed as part of the first and second processes in relation to web service client 110a and web service client 110c at the same time. In practice, if a composite application is serving as a web service for a large number of web service clients, each component application may be being executed as part of BPEL processes linked with tens or hundreds of web service clients at the same time.

The processing of a request received from a web service client of web service clients 110 by a BPEL process performing BPEL composite application 120 may result in the component applications 121, 122, 123, 124, 125 being performed in a set order or in a variable order dependent upon the receipt of data. Component applications 121, 122, 123, 124, 125 may also interact with an external application, such as external application 130. External application 130 may be operated on behalf of the same entity or a different entity from the entity that operates BPEL composite application 120. For example, external application 130 may be operated by a financial institution, another company, a different department, etc. For the instance of component application 123 to proceed, it may submit a request to external application 130 via network 152. Thus an instance of a component application may be required to wait until a response is received from external application 130 before any further processing of the thread.

The timing of the response from external application 130 may be based on the nature of the request. For example, a database lookup by external application 130 may take a short period of time, such as less than a second. However, an approval for a loan that is to be processed by external application 130, which may require an employee of the financial institution to manually review information, may take multiple days. As such, this may be a point in a BPEL process where the process is dehydrated until a response is received, thus freeing memory and/or processing resources while waiting for a response. Furthermore, another component application may be simultaneously waiting for a response from a different external application. The responses may arrive in different order or simultaneously depending upon when the responses are transmitted from the external services.

As an example, the instance of component application 124 may require additional information to be provided by the corresponding web service client. A request may be sent to the appropriate web service client. Again, processing of a composite application in relation to the web service client may halt until a response is received, possibly for a short period of time, such as 300 milliseconds, or possibly multiple days or even weeks. This may be another point where the BPEL process is dehydrated until a response is received in order to free processing and/or memory resources.

The process of performing the web service process for a web service client may take a short period of time, such as less than a second, or may take many hours or days to complete. If a large number of web service clients are using the web service provided by instances of BPEL composite application 120 and instances of the composite application within the BPEL processes take a long period of time to execute from start to finish, the BPEL processes may result in a large amount of data being stored and/or processed for web service clients 110. For periods of inactivity during the processing of instances of BPEL composite application 120 for particular web service clients, the associated processing threads (referred to as processes or BPEL processes) may represent a waste of processing and/or memory resources. As such, it may not be efficient to maintain data linked with a BPEL process in memory local to BPEL composite application 120, especially if BPEL composite application 120 is handling requests from many web clients at once and does not have excess memory to spare. Similarly, it may not be efficient to maintain BPEL processes in memory if nothing related to the web service client currently requires active processing. As such, dehydration of such BPEL processes may be used to free processing and/or memory resources.

As described above, at times during execution of BPEL composite application 120, it may be desirable to suspend execution of BPEL composite application 120 or one or more of components component 121, 122, 123, 124, and 125. For example, it may be desirable to suspend execution of BPEL composite application 120 while waiting for responses from one or more external web services. For example, while executing a BPEL process instance on activities like mid-receive where the execution can not be continued in current transaction, the BPEL engine persists instance state to dehydration store 160.

Persisting an instance state to dehydration store 160 is referred as dehydration whereas reconstructing instance state from dehydration store referred as rehydration. In dehydration, the BPEL Engine 170 persists process instance state to a storage system, referred to as dehydration store 160. When the instance is ready to execute (for example a response is received), the BPEL engine 170 reconstructs the instance state from dehydration store 160. Dehydration and rehydration play critical role in determine performance characteristics of BPEL engine, and depend on performance characteristics of dehydration store 160.

To speedup access to the dehydration store 160, the dehydration store 160 implements a cache 164 in addition to database 166. Cache 164 is a side non-transactional cache. In an embodiment cache 164 is implemented using ORACLE Coherence, an in-memory data grid solution that enables organizations to predictably scale mission-critical applications by providing fast access to frequently used data. One downside of the use of a cache to accelerate data access is that cache data can get out of synchronization with database 166. In multi process systems, many processes may attempt to update the same information at the same time. Out of sync objects in the cache are referred to as stale objects.

One way to address the issue of stale objects in cache 164 is add a version column to the relational database 166 and a corresponding version attribute to object in the Cache. In such a system, the BPEL engine can check the database 166 and the cache 164 prior to using the cached object in order to ensure that the cached object is not stale (i.e. the version of the cached object is the same as the version of the object in the database 166). However this method adds overhead and latency associated with managing version information, and testing version information by accessing the database.

In embodiments of the present invention dehydration store 160 includes a lock management system 162 which eliminates the added overhead of the version method by implementing a lock mechanism in cache 164. Lock management system 162 allows only one process to have control of a particular object in cache 164; another process cannot modify the same object. Lock management system 162 ensures that when a process retrieves an object from cache 164 to modify through a transaction, the cached object is locked until the transaction is committed to the database 166 or rolled back. The lock is held until the transaction is complete—thus providing data concurrency. Although locks can enforce database consistency, they can also create performance problems. Every time one process issues a lock, another user may be shut out from processing the locked row or table. Thus, it is desirable that the locking system and be method be efficient in avoiding unnecessary locking and releasing locks when warranted.

Figure 2:
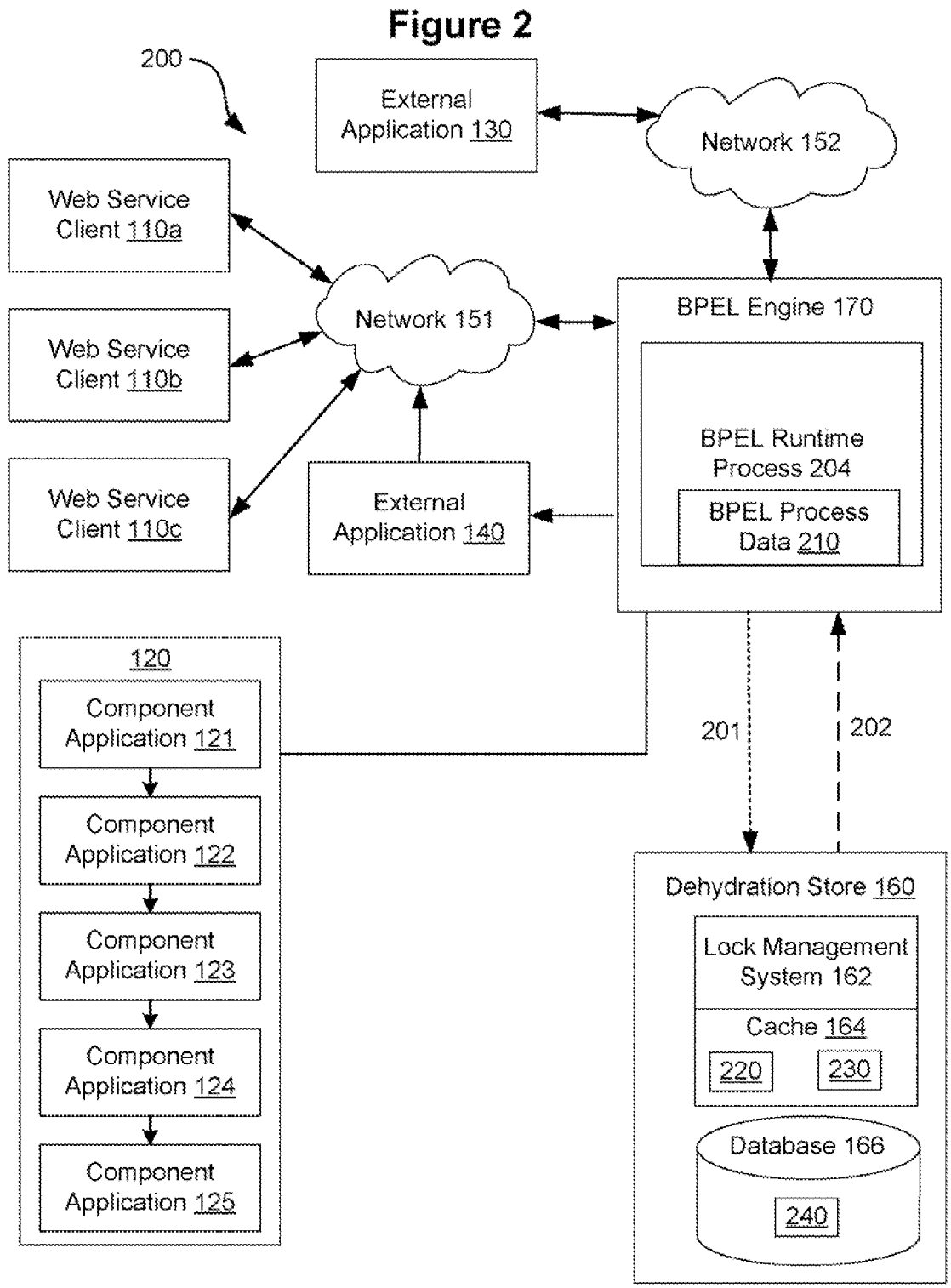
FIG. 2 illustrates an embodiment of a system configured to dehydrate and rehydrate a BPEL process utilizing an object lock management system according to an embodiment of the present invention.

FIG. 2 illustrates an embodiment of a system 200 configured to dehydrate and rehydrate a BPEL runtime process. System 200 may comprise BPEL engine 170 operating on one or more computer systems to execute and/or store various illustrated modules. For example, BPEL runtime process 204 may be executed by one or more computer systems of BPEL engine 170. Each of web service clients 110 may be a separate computer system. When the execution of the (JAVA) code of BPEL composite application 120 (that is, the BPEL runtime process 204 that is an instance of BPEL composite application 120) reaches a dehydration point (e.g., a point where a response from an external application is being waited for), BPEL runtime process 204 may be dehydrated. Such dehydration may involve data related to BPEL runtime process 204 being stored in dehydration store 160. When BPEL runtime process 204 is dehydrated, certain variables of BPEL runtime process 204 may be retained when BPEL runtime process 204 is dehydrated.

FIG. 2 illustrates a single BPEL runtime process being dehydrated 201 and rehydrated 202. BPEL runtime process 204 may be being executed for a particular web service client, such as web service client 110c. It should be understood that numerous BPEL runtime processes may be executed concurrently as instances of BPEL composite application 120 for multiple web service clients. As such, at any given time, one or more BPEL runtime processes may be being executed and one or more BPEL runtime processes may be dehydrated in dehydration store 160.

A trigger is received in relation to BPEL runtime process 204 that initiates rehydration of BPEL process data such that BPEL runtime process 204 may continue to be executed. For example, a response from an external application, such as external application 130, related to BPEL runtime process 204. To rehydrate BPEL runtime process 204, BPEL process data 210 may be recalled from dehydration store 160. BPEL process data 210 may be used to rehydrate the BPEL process for execution by BPEL runtime process 204. Following rehydration of BPEL process data 210, execution of BPEL runtime process 204 may continue. At some future point, BPEL runtime process 204 may again be dehydrated. BPEL runtime process 204 may be dehydrated and rehydrated various numbers of times as required for execution of the instance of BPEL composite application 120 as BPEL runtime process 204.

While system 200 of FIG. 2 illustrates a single BPEL runtime process instance being dehydrated and rehydrated, it should be understood that many BPEL processes may be at various stages of execution, dehydration, and rehydration. For example, it may be possible that tens, hundreds, or thousands of BPEL runtime processes may be at various stages of execution, dehydration, and/or rehydration of BPEL composite application 120.

BPEL process data 210 may be created based on BPEL runtime process 204. The BPEL process data 210 may be stored using dehydration store 160. Dehydration store 160 may include a storage arrangement such as a tables, stacks, or databases stored on non-transitory computer-readable media such as memory, hard drives and the like. Dehydration store 160 may comprise a distributed and clustered system of computers. In an embodiment of the present invention, dehydration store 160 includes a lock management system 162, a database 166, and a cache 164. As shown in FIG. 2, BPEL process data 210 is persisted in dehydration store as a database object 240 and a cached object 220. BPEL process data 210 may remain stored in dehydration store 160 until the response has been received from the external application that triggers the rehydration.

Lock management system 162 controls access to objects in cache 164. When a process attempts to access cached object 220, lock management system 162 examines the lock attributes of cached object 220 to see if is locked. In an embodiment of the invention, as shown in FIG. 2, the lock attributes of an object 220 are represented by an associated lockable object 230 stored in cache 164. Cached object 220 and lockable object 230 are associated using an identification code. If the object 220 is not locked (determined by examining lockable 230), lock management system 162, locks the object using lockable 230, sets object with lock acquire time stamp using lockable 230, updates cache 164 and returns the object 220 to the requesting process. If the object 220 is locked, the lock management system 162 examines the lock acquire time stamp in lockable 230 and lock expiration time to determine whether the lock has expired. If the lock has expired, lock management system 162, locks the object using lockable 230, sets object with lock acquire time stamp in lockable 230, updates cache 164 and returns the object 220 to the requesting process. If the object 220 is locked, and the lock in lockable 230 has not expired, lock management system 162, throws an exception with the details of the current lock and does not provide the object 220 to the requesting process.

Figure 3:
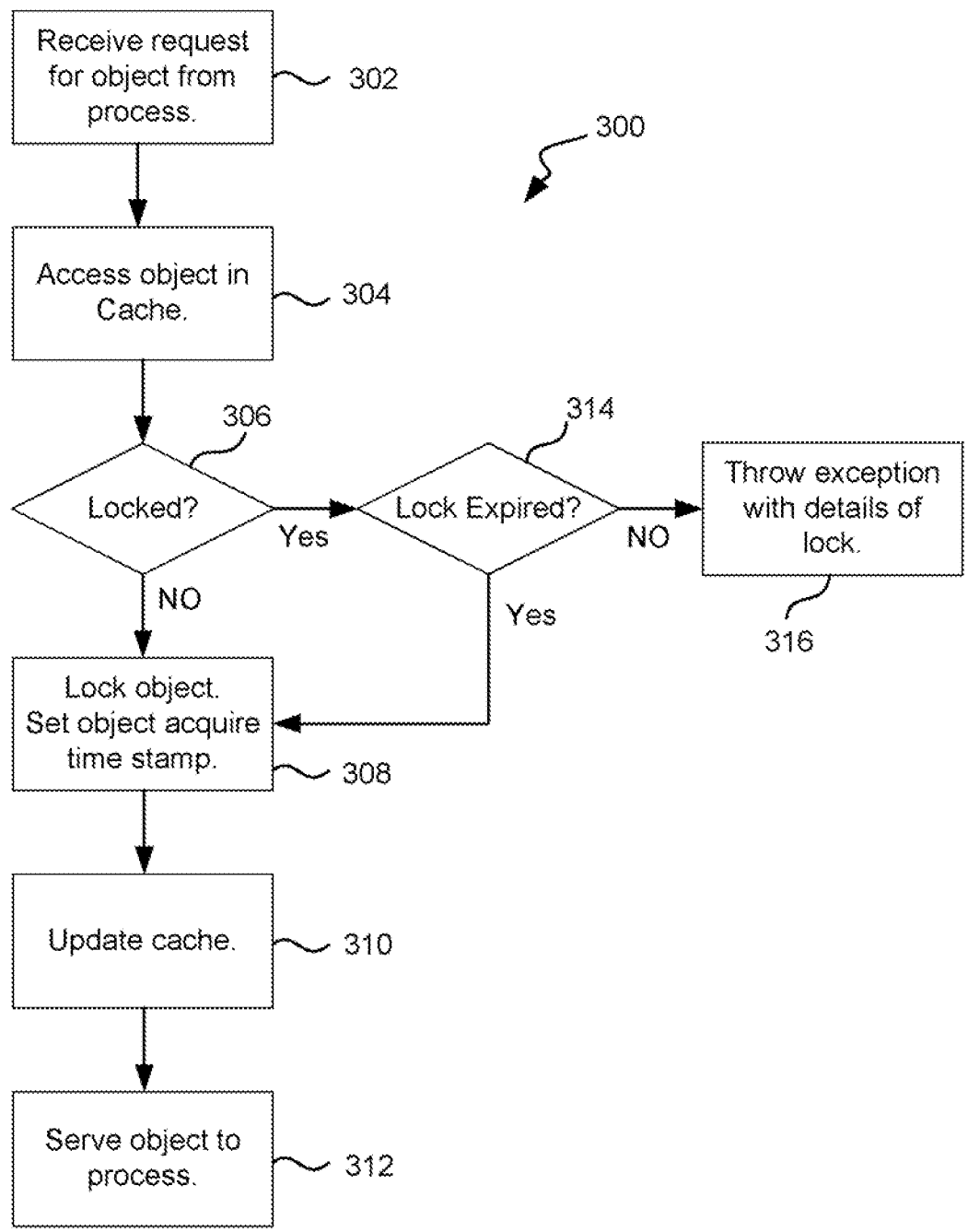
FIG. 3 illustrates a method for implementing lock management functionality according to an embodiment of the present invention.

FIG. 3 illustrates a method for implementing the lock management functionality of lock management system 162 upon attempted access to an object. In an embodiment of the present invention, objects in the cache manage exclusive access to them using EntryProcessor. EntryProcessor is a mechanism Coherence provides to execute a snippet of code in an atomic fashion. The following logic may be implemented in EntryProcessor to effect the lock management functionality upon attempted access to an object:

If object is not locked (Boolean attribute), it locks objects, sets object with lock acquire time stamp, updates cache and returns object;

If object is locked, and lock is expired (lock acquire time stamp plus lock expiration time), it locks objects, sets object with lock acquire time stamp, updates cache and returns object; and If object is locked, and lock is not expired, throws exception with details of current lock.

The logic addresses the issue of stale objects in the cache while eliminating a round to the database for version check and storing of version information.

As shown in FIG. 3, at step 302, EntryProcessor receives a request for an object from a process on the BPEL engine. At step 304, EntryProcessor access the cached objects and retrieves the object's lock attributes, lockable, lock time stamp, and lock expiration. At step 306, EntryProcessor determines if the object is locked. In an embodiment of the present invention, the lock is implemented as a companion lock object in the cache. The companion lock object is created when a lock is acquired, and erased when a lock is released. Accordingly, in this implementation determining if the object is locked is performed by determining whether there is a companion lock object—if there is no companion lock object, the requested object is not locked. At step 306, if the object is not locked, the method proceeds to step 308. At step 308, EntryProcessor locks the object (by creating the companion lock object) and sets the object acquire stamp (in the companion lock object). At step 310, EntryProcessor updates the cache with the new attributes for the cached object (by writing the companion lock object to cache—lockable, lock time stamp). At step 312, EntryProcessor serves the object to the requesting process on the BPEL engine.

At step 306, if the object is locked (i.e. the companion lock object to the requested object is found), the method proceeds to step 314. At step 314, EntryProcessor determines if the lock is expired by examining the lock time stamp, and lock expiration (in the companion lock object). At step 314, if the lock is expired, the method proceeds to steps 308, 310, and 312 and serves the object to the requesting process on the BPEL engine. EntryProcessor locks the object and sets the object acquire stamp (by rewriting the companion lock object to cache). At step 314, if the lock is not expired, the method proceeds to step 316. At step 316, EntryProcessor throws an exception including detail of the lock (lock time stamp, and lock expiration). The object is not served to the requesting process.

Figure 4A:
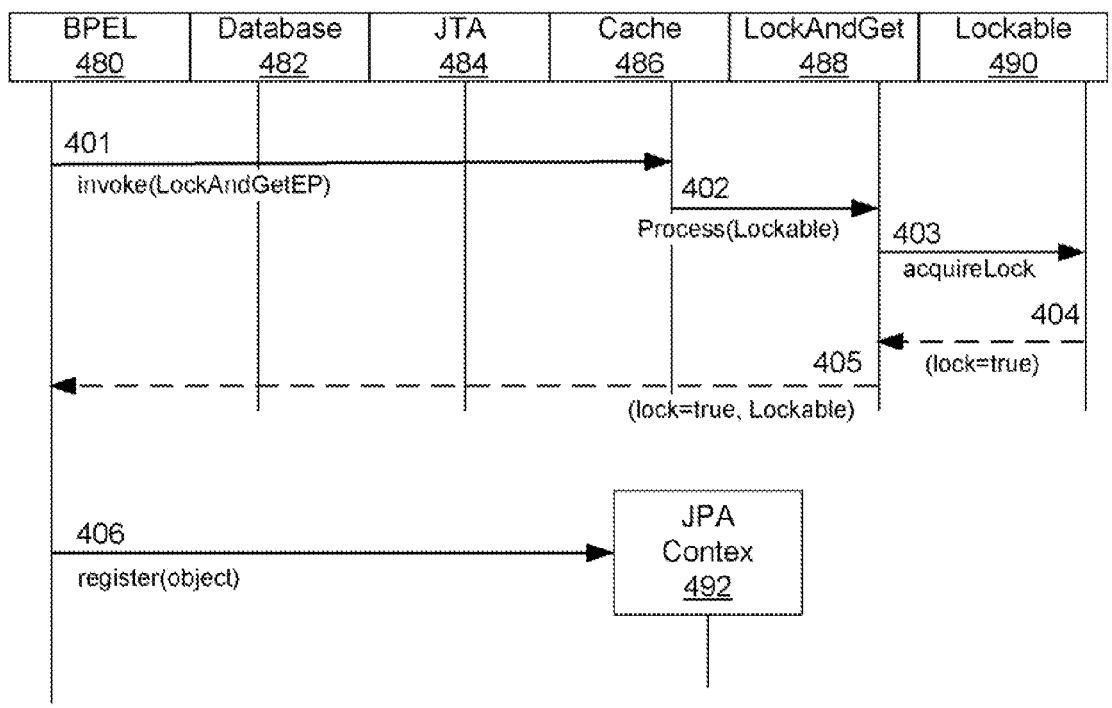
Figure 4B:
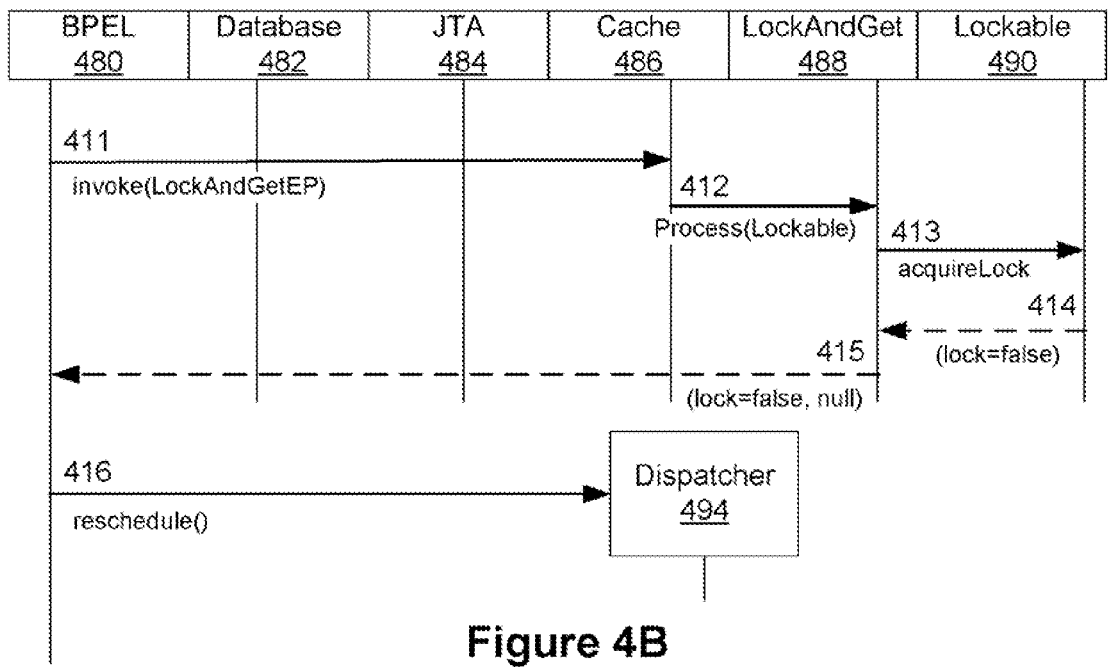

FIGS. 4A-4D illustrate sequence diagrams for operation of dehydration store 160 including lock management system 162. In general, a cache can be used as a front end to speedup access to a database where the database remains the data system of record. Alternatively, the cache is the data store and the system of record and there is no backend database. In this case, the cache should be large enough to hold all the active data. FIG. 4A shows a sequence diagram for object lookup during rehydration. FIG. 4B shows a sequence diagram for object lookup contention during rehydration. FIG. 4C shows a sequence diagram for dehydration where the transaction commits. FIG. 4D shows a sequence diagram for dehydration with transaction rollback.

In the Figures, BPEL 480 is a process running on the BPEL engine; LockAndGet 488 is a Coherence entity processor that implements logic for managing object lock; JPA Context 492 is context provided by object to relational mapping storage framework (in a particular embodiment this is an eclipse link); JTA 484 is a Java Transaction API to manage transactions (this may be implemented in Oracle Weblogic server); Dispatcher 494 is a BPEL engine scheduling and execution implementation that facilitates an asynchronous execution model, it comprises queues that sequence work and thread pools that picks next available work and executes.

Lockable 490 is cached object which represents the lock state of an associated business process instance object. A particular lockable object is associated with a business process instance object in cache because they are both keyed to the same identification code. Lockable object 490 includes a Boolean attribute—locked/not locked, as well as a time stamp for the time of lock acquisition. In a particular implementation, the Boolean attribute is represented by the presence or absence of a lockable 490 object with the same identification code as a requested business process instance object, and the time stamp is represented by an attribute of the lockable 490 object. In an alternative embodiment, each business process instance object in the cache may be provided with a companion lockable 490 object, in which case, the each lockable object may include two attributes locked/not locked, as well as a time stamp for the time of lock acquisition.

Referring to FIG. 4A which shows a sequence diagram for object lookup during rehydration. FIG. 4A shows the execution sequence for a successful object look up. Upon successful object lookup, the system locks the object, stores it in the cache, and serves the requested object to the BPEL engine. At step 401, BPEL 480 requests a business process instance object from Cache 486. At step 402, Cache 406 implements the LockandGet entity processor 488. At step 403, LockandGet entity processor 488 searches for the associated object Lockable 490. At step 404, no Lockable 490 is found to be associated with the requested object or, a Lockable 490 is found but the time stamp indicates the lock has expired—thus indicating that no current (non-expired) lock exists and therefore a lock (or new lock) can be acquired. At step 405, the LockandGet entity processor 488, transmits the business process instance object to BPEL 480. At step 406, BPEL 480 registers the object with JPA Context 492.

Referring to FIG. 4B which shows a sequence diagram for object lookup contention during rehydration. FIG. 4B shows the execution sequence for an unsuccessful object look up. The object is already locked and thus the lock cannot be acquired. The object cannot be served to the BPEL engine and the request for the object is rescheduled. At step 411, BPEL 480 requests a business process instance object from Cache 486. At step 412, Cache 406 implements the LockandGet entity processor 488. At step 413, LockandGet entity processor 488 attempts to acquire a lock on the object by searching for the associated Lockable 490 object. At step 414, the Lockable 490 object is found (indicating that the associated object is locked), and the time stamp of the Lockable 490 object indicates that the lock has not expired, thereby indicating that a lock can not be acquired. At step 415, the LockandGet entity processor 488, transmits an error message to BPEL 480. At step 416, BPEL 480 transmits a request to dispatcher 494 to reschedule the request for the object.

Referring to FIG. 4C which shows a sequence diagram for dehydration where the transaction commits. FIG. 4C shows the execution sequence for releasing a business process instance object upon successful completion of a transaction. At step 421, BPEL 480 transmits the business process instance object to Database 482. At step 422, JTA 484 responds to BPEL 480 after completion of writing the object to the database. The business object instance update by the committed transaction is also written to Cache. At step 423, BPEL 480 removes the Lockable 490 object associated with the business process instance object, thereby releasing the lock on the cached object. At step 424, BPEL 480 writes the object to Cache 486.

Referring to FIG. 4D which shows a sequence diagram for dehydration with transaction rollback. FIG. 4D shows the execution sequence for releasing an object upon rollback of a transaction. At step 431, BPEL 480 transmits the object to Database 482. At step 422, JTA 484 responds to BPEL 480 after failure of writing the object to the database thereby triggering rollback of the transaction. At step 433, BPEL 480 communicates with Cache 486 which invokes the ReleaseLock entity processor 488 at step 434. At step 435, the ReleaseLock entity processor 488 resets the lock attributes of the cached object, by removing the associated Lockable 490 object, thereby releasing the lock.

While methods described above are directed to the use object lock management in a BPEL system, it should be understood that a similar method may be applied to other business-process directed programming languages that are configured to have processes dehydrated, or, more generally, other programming languages that are configured to have processes dehydrated. While the above systems and methods focus on optimizing BPEL systems using object lock management, it may be possible to apply similar principles as detailed herein to perform other compiler optimization in BPEL.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/ or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for enhancing performance of a business process execution engine, the method comprising:
   persisting a business process instance in a storage system, wherein the storage system comprises a database, a cache, and a lock management system operating on one or more microprocessor, and wherein persisting the business process instance creates a cached business process instance object;
   receiving a request for access to the business process instance from the business process execution engine;
   determining, by accessing the cache, whether the cached business process instance is locked, including
      determining if the cached business process instance object is associated with a lock object stored in the cache, and if so then accessing the lock object to determine if a lock has expired; and
      determining that the cached business process instance object is not locked if there is no lock object associated with the cached business process instance object or if an associated lock object indicates that the lock has expired;
   serving the cached business process instance to the business process execution engine, if the cached business process instance is not locked; and
   if the cached business process instance is locked, then rescheduling or not serving the cached business process instance to the business process execution engine.

2. The method of claim 1, wherein said serving step comprises:
   serving the cached business process instance to the business process execution engine, if the cached business process instance is not locked, and locking the cached business process instance by creating in said cache a lock object associated with said cached business process instance.

3. The method of claim 1, wherein said serving step comprises:
   serving the cached business process instance to the business process execution engine, if the cached business process instance is not locked, and locking the cached business process instance by creating in said cache a lock object associated with said cached business process instance, wherein said lock object includes a time stamp indicative of the time said lock object was created.

4. The method of claim 1, further comprising:
   receiving an update to said cached business process instance;
   persisting an updated business process instance in the database;
   copying said updated business process instance to said cache as a cached updated business process instance; and
   releasing the lock applicable to said cached updated business process instance.

5. The method of claim 1, further comprising:
   receiving an update to said cached business process instance;
   persisting an updated business process instance in the cache as a cached updated business process instance; and
   releasing the lock applicable to said cached updated business process instance.

6. A non-transitory computer readable storage medium including instructions stored thereon which, when executed by a computer, cause the computer to perform a method comprising the steps of:
   persisting a business process instance in a storage system, wherein the storage system comprises a database, a cache, and a lock management system operating on one or more microprocessor, and wherein persisting the business process instance creates a cached business process instance object;
   receiving a request for access to the business process instance from the business process execution engine;
   determining, by accessing the cache, whether the cached business process instance is locked, including
      determining if the cached business process instance object is associated with a lock object in the cache, and if so then accessing the lock object to determine if a lock has expired; and
      determining that the cached business process instance object is not locked if there is no lock object associated with the cached business process instance object or if an associated lock object indicates that the lock has expired;
   serving the cached business process instance to the business process execution engine, if the cached business process instance is not locked; and
   if the cached business process instance is locked, then rescheduling or not serving the cached business process instance to the business process execution engine.

7. The non-transitory computer readable storage medium of claim 6, wherein said serving step comprises: serving the cached business process instance to the business process execution engine, if the cached business process instance is not locked, and locking the cached business process instance by creating in said cache a lock object associated with said cached business process instance.

8. The non-transitory computer readable storage medium of claim 6, wherein said serving step comprises:
   serving the cached business process instance to the business process execution engine, if the cached business process instance is not locked, and locking the cached business process instance by creating in said cache the lock object associated with said cached business process instance, wherein said lock object includes a time stamp indicative of the time said lock object was created.

9. The non-transitory computer readable storage medium of claim 6, wherein the method further comprises:
   receiving an update to said cached business process instance;
   persisting an updated business process instance in the database;
   copying said updated business process instance to said cache as a cached updated business process instance; and
   releasing the lock applicable to said cached updated business process instance.

10. The non-transitory computer readable storage medium of claim 6, wherein the method further comprises:
    receiving an update to said cached business process instance;
    persisting an updated business process instance in the cache as a cached updated business process instance; and
    releasing the lock applicable to said cached updated business process instance.

11. A system for enhancing performance of a business process execution engine, the system comprising:
    a storage system, including a database and a cache, wherein the storage system is adapted for persisting a business process instance by creating a cached business process instance object and a database business process instance object; and
    a lock management system operating on one or more microprocessor of the system wherein the lock management system is adapted to perform the steps of,
    receiving a request for access to the business process instance from the business process execution engine,
    determining, by accessing, the cache whether the cached business process instance is locked, including
        determining if the cached business process instance object is associated with a lock object stored in the cache, and if so then accessing the lock object to determine if a lock has expired, and
        determining that the cached business process instance object is not locked if there is no lock object associated with the cached business process instance object or if an associated lock object indicates that the lock has expired,
    serving the cached business process instance to the business process execution engine, if the cached business process instance is not locked; and
    if the cached business process instance is locked, then rescheduling or not serving the cached business process instance to the business process execution engine.

12. The system of claim 11, wherein said serving step comprises:
    serving the cached business process instance to the business process execution engine, if the cached business process instance is not locked, and locking the cached business process instance by creating in said cache a lock object associated with said cached business process instance.

13. The system of claim 11, wherein said serving step comprises:
    serving the cached business process instance to the business process execution engine, if the cached business process instance is not locked, and locking the cached business process instance by creating in said cache a lock object associated with said cached business process instance, wherein said lock object includes a time stamp indicative of the time said lock object was created.

14. The system of claim 11, wherein said lock management system is further adapted to perform the step of:
    receiving an update to said cached business process instance;
    persisting an updated business process instance in the database;
    copying said updated business process instance to said cache as a cached updated business process instance; and
    releasing a lock applicable to said cached updated business process instance.

\* \* \* \* \*